(12) United States Patent
Zhang et al.

(10) Patent No.: US 10,558,331 B2
(45) Date of Patent: *Feb. 11, 2020

(54) TERMINAL DEVICE AND METHOD FOR DESIGNING NETWORK APPLICATION PRODUCT

(71) Applicant: TENCENT TECHNOLOGY (SHENZHEN) COMPANY LIMITED, Shenzhen (CN)

(72) Inventors: Zhenwei Zhang, Shenzhen (CN); Ling Wang, Shenzhen (CN); Wenpei Hou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/994,542

(22) Filed: May 31, 2018

(65) Prior Publication Data

US 2018/0275841 A1 Sep. 27, 2018

Related U.S. Application Data

(63) Continuation of application No. 14/592,637, filed on Jan. 8, 2015, now Pat. No. 10,013,145, which is a
(Continued)

(30) Foreign Application Priority Data

Jul. 18, 2013 (CN) .......................... 2013 1 0303491

(51) Int. Cl.
*G06F 3/0482* (2013.01)
*G06Q 10/06* (2012.01)

(52) U.S. Cl.
CPC ..... *G06F 3/0482* (2013.01); *G06Q 10/06311* (2013.01)

(58) Field of Classification Search
CPC .................. G06F 3/0482; G06Q 10/06311
See application file for complete search history.

(56) References Cited

U.S. PATENT DOCUMENTS 4,616,327 A * 10/1986 Rosewarne ......... G06F 3/04845
345/636
5,649,216 A * 7/1997 Sieber ..................... G06T 11/60
715/234

(Continued)

FOREIGN PATENT DOCUMENTS

CN 1162784 A 10/1997
CN 102662568 A 9/2012
CN 103365663 A 10/2013

*Primary Examiner* — Mandrita Brahmachari
(74) *Attorney, Agent, or Firm* — Anova Law Group, PLLC

(57) ABSTRACT

Terminal devices and methods for designing a network application product are provided. The terminal device includes a task starting interface, a graphical displaying interface, an inputting interface. The task starting interface is configured to receive a task starting instruction to obtain a plurality of first type e-cards having at least one dimensionality type. Each first type e-card contains graphic information corresponding to a dimensionality type and text information corresponding to the graphic information. The graphical displaying interface is configured to display the plurality of first type e-cards. The inputting interface is configured to receive an inputting instruction to select at least two first type e-cards from the plurality of first type e-cards. The inputting interface is further configured to receive context information generated by correlating information including the graphic information and the text information on the at least two first type e-cards.

20 Claims, 14 Drawing Sheets

Related U.S. Application Data continuation of application No. PCT/CN2014/081014, filed on Jun. 27, 2014.

(56) References Cited

U.S. PATENT DOCUMENTS

| | | |
|---|---|---|
| 2003/0048308 A1 | 3/2003 | Friedlander |
| 2005/0271352 A1 | 12/2005 | Yokouchi |
| 2006/0192991 A1* | 8/2006 | Donahoe ................. G06F 16/93 358/1.15 |
| 2007/0101281 A1 | 5/2007 | Simpson et al. |
| 2007/0238082 A1 | 10/2007 | Ingrassia |
| 2007/0247666 A1 | 10/2007 | Tsitoukis |
| 2008/0049025 A1* | 2/2008 | Le Tuan ................. G06T 13/80 345/473 |
| 2008/0270415 A1 | 10/2008 | Chatow et al. |
| 2009/0196520 A1 | 8/2009 | Devoy et al. |
| 2012/0036745 A1* | 2/2012 | Chen .................... B42D 15/027 40/124.01 |
| 2013/0159445 A1 | 6/2013 | Zonka et al. |
| 2013/0169993 A1* | 7/2013 | Stein ..................... G06Q 30/06 358/1.15 |

* cited by examiner

TERMINAL DEVICE AND METHOD FOR DESIGNING NETWORK APPLICATION PRODUCT

CROSS-REFERENCES TO RELATED APPLICATIONS

This application is a continuation application of U.S. patent application Ser. No. 14/592,637, filed on Jan. 8, 2015 and now U.S. Pat. No. 10,013,145 issued on Jul. 3, 2018. U.S. patent application Ser. No. 14/592,637 (now U.S. Pat. No. 10,013,145 issued on Jul. 3, 2018) is a continuation application of PCT Patent Application No. PCT/CN2014/081014, filed on Jun. 27, 2014, which claims priority to Chinese Patent Application No. 201310303491.2, filed on Jul. 18, 2013, the entire content of all of which is incorporated herein by reference.

FIELD OF THE DISCLOSURE

The present disclosure relates to the field of terminal devices and, more particularly, relates to terminal devices and methods for designing a network application product.

BACKGROUND

In an early stage of a project for developing a new network application product and/or for adding a new function to a certain network application product, originality/concept may first be formed by designers. Conventional methods for forming the originality often completely depend on inspiration and conception of the designer and limited by this designer. Although the designers can make use of photos and objects to process originality and imagination, the resultant effect may not be satisfying, the originality may not be easily formed, and the efficiency for designing products is relatively low.

Thus, there is a need to overcome these and other problems of the prior art and to provide terminal devices and methods for designing a network application product.

BRIEF SUMMARY OF THE DISCLOSURE

One aspect or embodiment of the present disclosure includes a terminal device for designing a network application product. The terminal device includes a task starting interface, a graphical displaying interface, and an inputting interface. The task starting interface is configured to receive a task starting instruction to obtain a plurality of first type e-cards having at least one dimensionality type, according to the task starting instruction. Each first type e-card of the plurality of first type e-cards contains graphic information corresponding to a dimensionality type and text information corresponding to the graphic information. The graphical displaying interface is configured to display the plurality of first type e-cards. The inputting interface is configured to receive an inputting instruction to select at least two first type e-cards from the plurality of first type e-cards according to the inputting instruction. The inputting interface is further configured to receive context information inputted by a user and the context information is generated by correlating information including the graphic information and the text information on the at least two first type e-cards.

Another aspect or embodiment of the present disclosure includes a terminal device for designing a network application product. The terminal device includes a graphic-user interface, a display device, a processor, and a storage device. The graphic-user interface is configured to receive a task starting instruction to obtain a plurality of first type e-cards having at least one dimensionality type, according to the task starting instruction. Each first type e-card of the plurality of first type e-cards contains graphic information corresponding to a dimensionality type and text information corresponding to the graphic information. The display device is configured to display the plurality of first type e-cards. The processor is configured to receive an inputting instruction to select at least two first type e-cards from the plurality of first type e-cards according to the inputting instruction. The graphic-user interface is further configured to receive context information inputted by a user, and the context information is generated by correlating information comprising the graphic information and the text information on the at least two first type e-cards. The storage device is configured to store the plurality of first type e-cards.

Another aspect or embodiment of the present disclosure includes a method for designing a network application product by a terminal device. A task starting instruction is received to obtain a plurality of first type e-cards having at least one dimensionality type according to the task starting instruction. Each first type e-card of the plurality of first type e-cards contains graphic information corresponding to a dimensionality type and text information corresponding to the graphic information. A graphical displaying interface is used to display the plurality of first type e-cards. An inputting interface is used to receive an inputting instruction to select at least two first type e-cards from the plurality of first type e-cards according to the inputting instruction and to receive context information inputted by a user. The context information is generated by correlating information comprising the graphic information and the text information on the at least two first type e-cards.

Another aspect or embodiment of the present disclosure includes a method for designing a network application product. A first terminal device appoints at least one first type e-card from a plurality of first type e-cards that contain at least one dimensionality type, and sends an ID of the at least one first type e-card to at least one second terminal device. Each first type e-card of the plurality of first type e-cards contains graphic information corresponding to a dimensionality type of the each first type e-card and text information corresponding to the graphic information. The second terminal device receives the ID to obtain and display the at least one first type e-card corresponding to the ID, and selects and displays at least another first type e-card from remaining first type e-cards that do not include the at least one first type e-card corresponding to the ID. The second terminal device receives context information inputted by a user and generated by correlating information comprising the graphic information and the text information on the at least one first type e-card and the at least another first type e-card that are displayed. The second terminal device returns the context information to the first terminal device.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-11 depict exemplary terminal devices and methods for designing a network application product in accordance with various embodiments. The exemplary terminal devices and methods for designing a network application product can be implemented in an environment as shown in FIG. 12.

Figure 12:
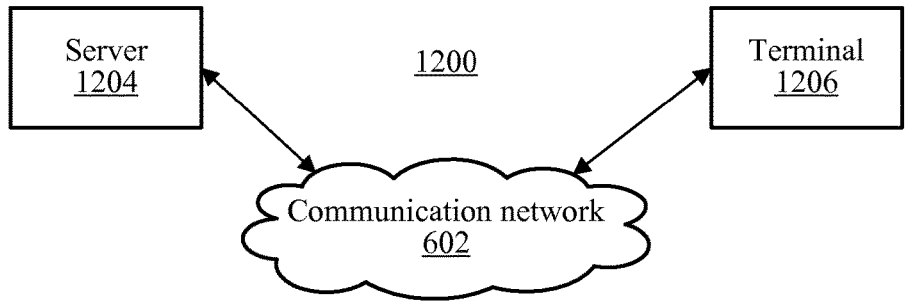
FIG. 12 depicts an exemplary environment incorporating certain disclosed embodiments.

For example, an environment 1200 in FIG. 12 can include a server 1204, a terminal 1206, and a communication network 1202. The server 1204 and the terminal 1206 can be coupled through the communication network 1202 for information exchange, for example, Internet searching, webpage browsing, etc. Although only one terminal 1206 and one server 1204 are shown in the environment 1200, any number of terminals 1206 or servers 1204 may be included, and other devices may also be included.

The communication network 1202 may include any appropriate type of communication network for providing network connections to the server 1204 and terminal 1206 or among multiple servers 1204 or terminals 1206. For example, the communication network 1202 may include the Internet or other types of computer networks or telecommunication networks, either wired or wireless.

A terminal, as used herein, may refer to any appropriate user terminal device with certain computing capabilities, for example, a personal computer (PC), a work station computer, a notebook computer, a car computer (e.g., carrying in a car or other vehicles), a server computer, a hand-held computing device (e.g., a tablet computer), a mobile terminal (e.g., a mobile phone, a smart phone, an iPad, and/or an aPad), a POS (i.e., point of sale) device, or any other user-side computing device. In various embodiments, the terms "terminal" and "terminal device" can be used interchangeably.

A server, as used herein, may refer one or more server computers configured to provide certain server functionalities, for example, search engines and database management. A server may also include one or more processors to execute computer programs in parallel.

Figure 13:
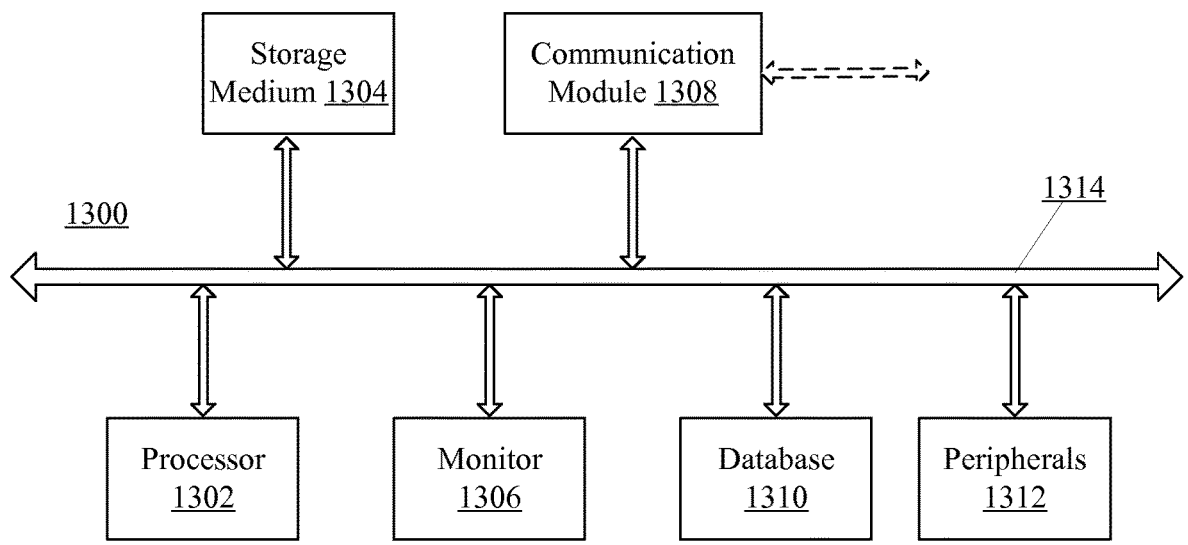
FIG. 13 depicts an exemplary computer system consistent with the disclosed embodiments.

The server 1204 and the terminal 1206 may be implemented on any appropriate computing/computer platform. FIG. 13 shows a block diagram of an exemplary computing system 1300 capable of implementing the server 1204 and/or the terminal 1206. As shown in FIG. 13, the exemplary computer system 1300 may include a processor 1302, a storage medium 1304, a monitor 1306, a communication module 1308, a database 1310, peripherals 1312, and one or more bus 1314 to couple the devices together. Certain devices may be omitted and other devices may be included.

The processor 1302 can include any appropriate processor or processors. Further, the processor 1302 can include multiple cores for multi-thread or parallel processing. The storage medium 1304 (e.g., a non-transitory computer-readable medium) may include memory modules, for example, ROM, RAM, and flash memory modules, and mass storages, for example, CD-ROM, U-disk, removable hard disk, etc. The storage medium 1304 may store computer programs for implementing various processes, when executed by the processor 1302.

Further, the peripherals 1312 may include I/O devices, for example, keyboard and mouse, and the communication module 1308 may include network devices for establishing connections through the communication network 1202. The database 1310 may include one or more databases for storing certain data and for performing certain operations on the stored data, for example, webpage browsing, database searching, etc.

In operation, the terminal 1206 may cause the server 1204 to perform certain actions, for example, an Internet search or other database operations. The server 1204 may be configured to provide structures and functions for such actions and operations. More particularly, the server 1204 may include a data searching system for real-time database searching. In various embodiments, a terminal, for example, a mobile terminal involved in the disclosed methods and devices can include the terminal 1206.

Figure 1:
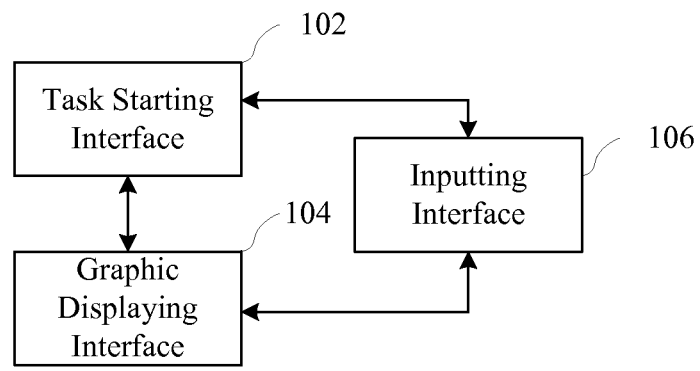
FIG. 1 depicts an exemplary terminal device for developing originality to design a network application product consistent with various disclosed embodiments.

FIG. 1 depicts an exemplary terminal device for developing originality consistent with various disclosed embodiments. The terminal device, e.g., for developing originality/concept to design a network application product, may include, but be not limited to, desktop computers (PCs), laptop portable computers, personal digital assistants (PDAs), tablet computers, smart phones, e-book readers, MP3 (Moving Picture Experts Group Audio Layer III) players, MP4 (Moving Picture Experts Group Audio Layer IV) players, POS terminals, and car-carried computers.

The exemplary terminal device includes a task starting interface 102, a graphic displaying interface 104, and an inputting interface 106.

The task starting interface 102 is configured to receive a task starting instruction to obtain a plurality of first type e-cards having at least one dimensionality type according to the task starting instruction. Each first type e-card of the plurality of first type e-cards contains graphic information corresponding to a dimensionality type and text information corresponding to the graphic information.

The graphical displaying interface 104 is configured to display the plurality of first type e-cards. The inputting interface 106 is configured to receive an inputting instruction to select at least two first type e-cards from the plurality of first type e-cards according to the inputting instruction. In one embodiment, the inputting interface 106 is further configured to receive context (e.g., originality and/or concept) information inputted by a user and the context information is generated by correlating information comprising the graphic information and the text information on the at least two first type e-cards.

The graphic information on each first type e-card can correspond to a feature graphic of the dimensionality (type) tied with the first type e-card, while the text information on each first type e-card can include a word group (or a group of words) corresponding to the feature graphic and/or indicative words corresponding to the word group.

In various embodiments, the first type e-card can be referred to as a dimensionality (type) e-card. Each dimensionality e-card (or each first type e-card) can correspond to one type of dimensionality selected from various types of dimensionality. Each dimensionality e-card (or each first type e-card) can display graphic information and text information corresponding to dimensionality type tied with the dimensionality e-card (or the first type e-card).

In one embodiment, the at least one dimensionality type can include one or more dimensionality types including character (or person), object (or substance), event (or incident), time, place, etc.

Figure 2:
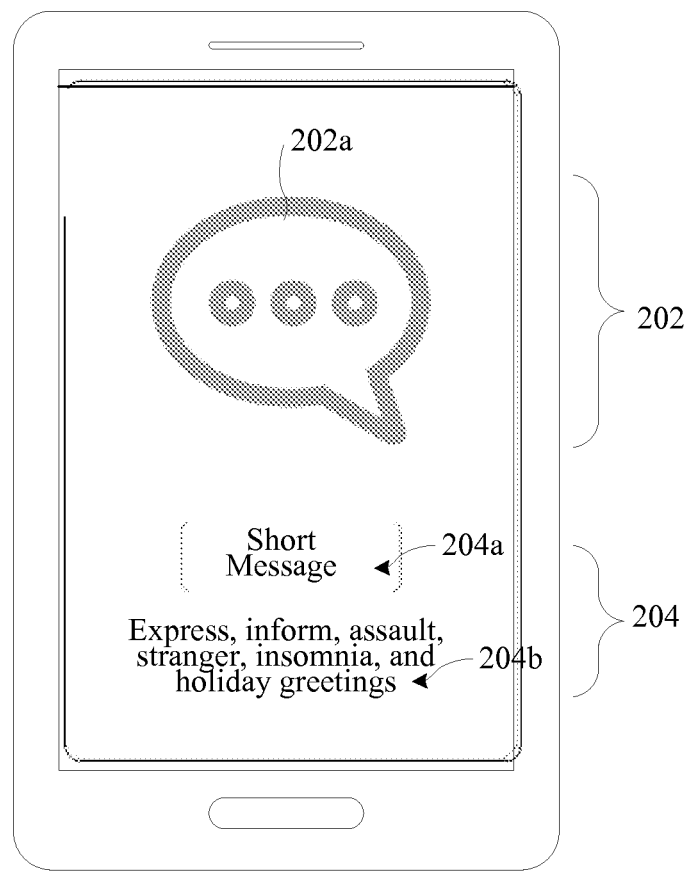
FIG. 2 depicts an exemplary first type e-card consistent with various disclosed embodiments.
Figure 3A:
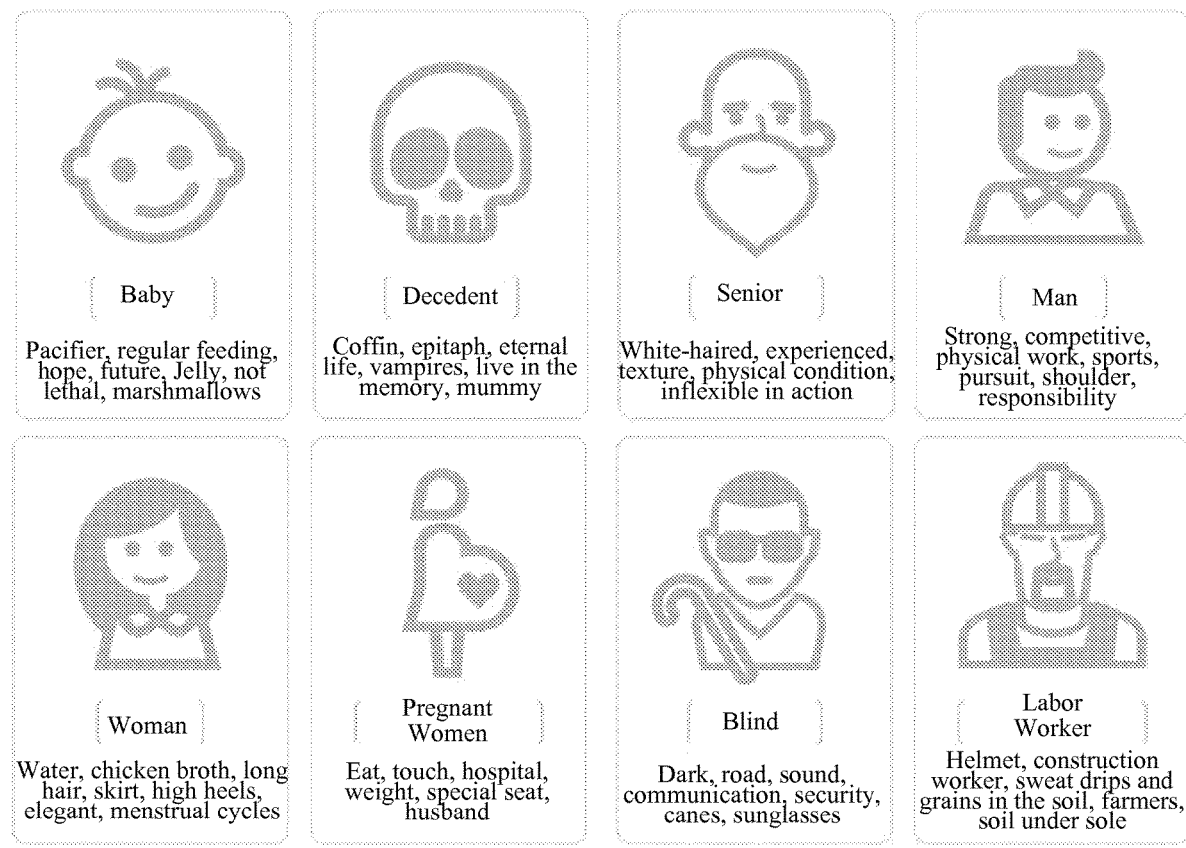
FIG. 3A-3E depict various exemplary dimensionality e-cards having various dimensionality types including character, object, event, place, and time consistent with various disclosed embodiments.
Figure 3B:
Figure 3C:
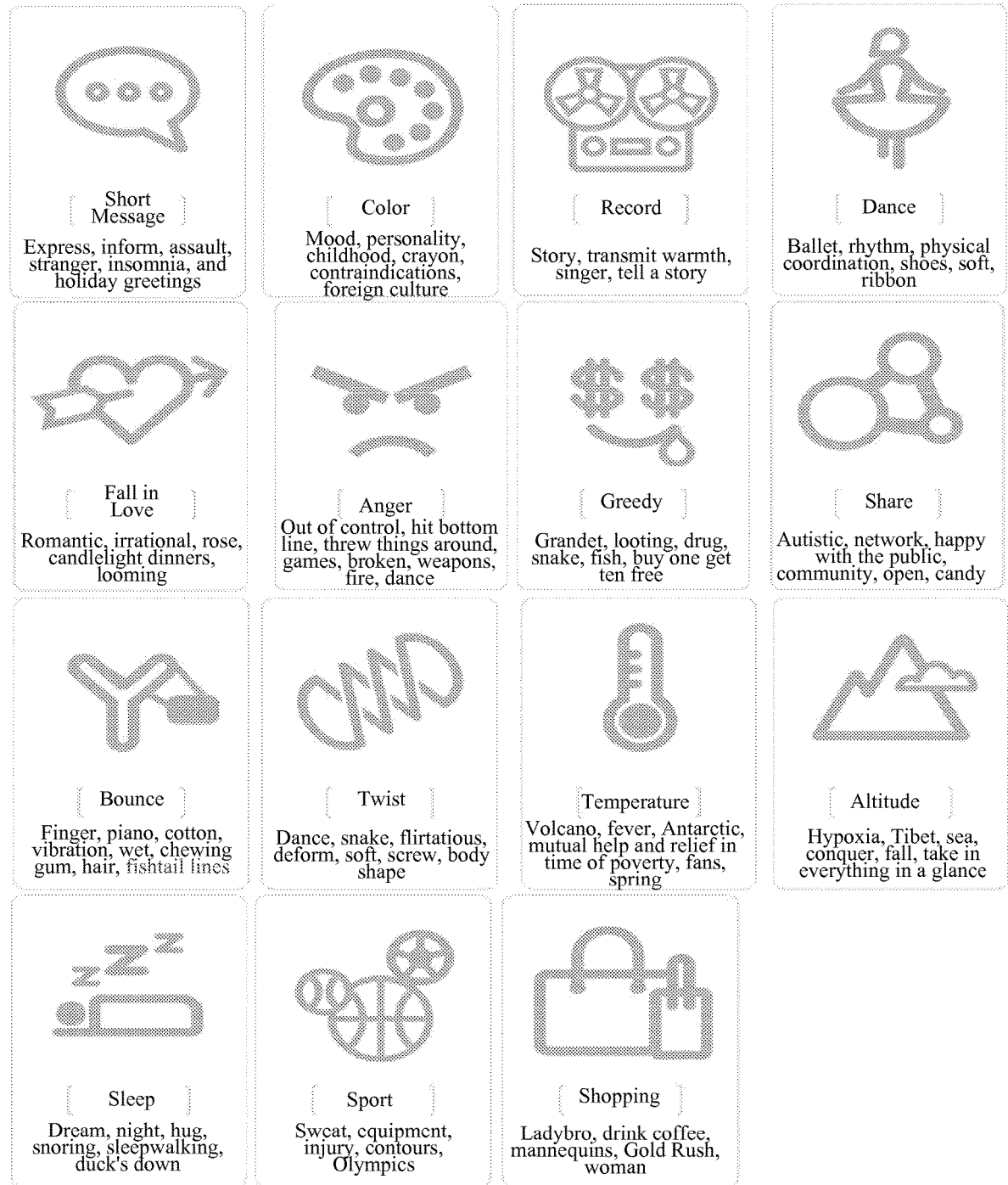
Figure 3D:
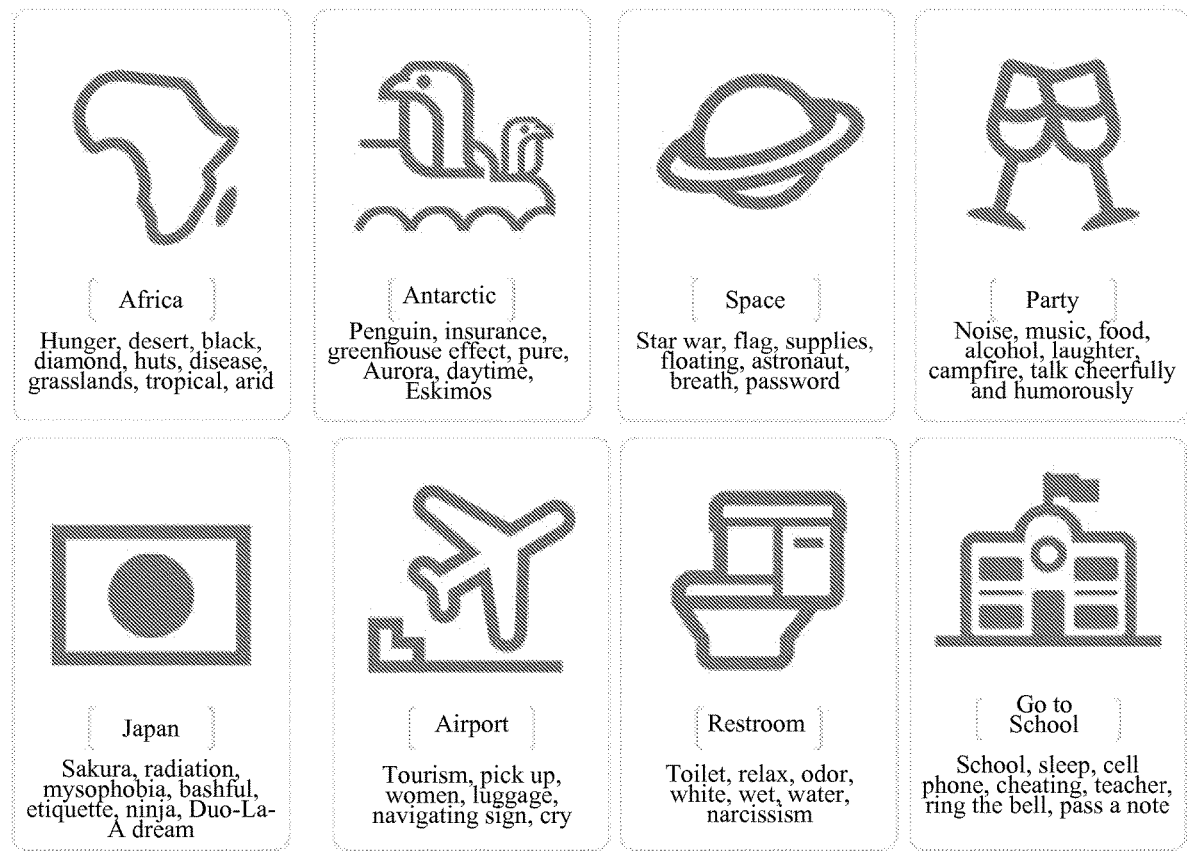
Figure 3E:
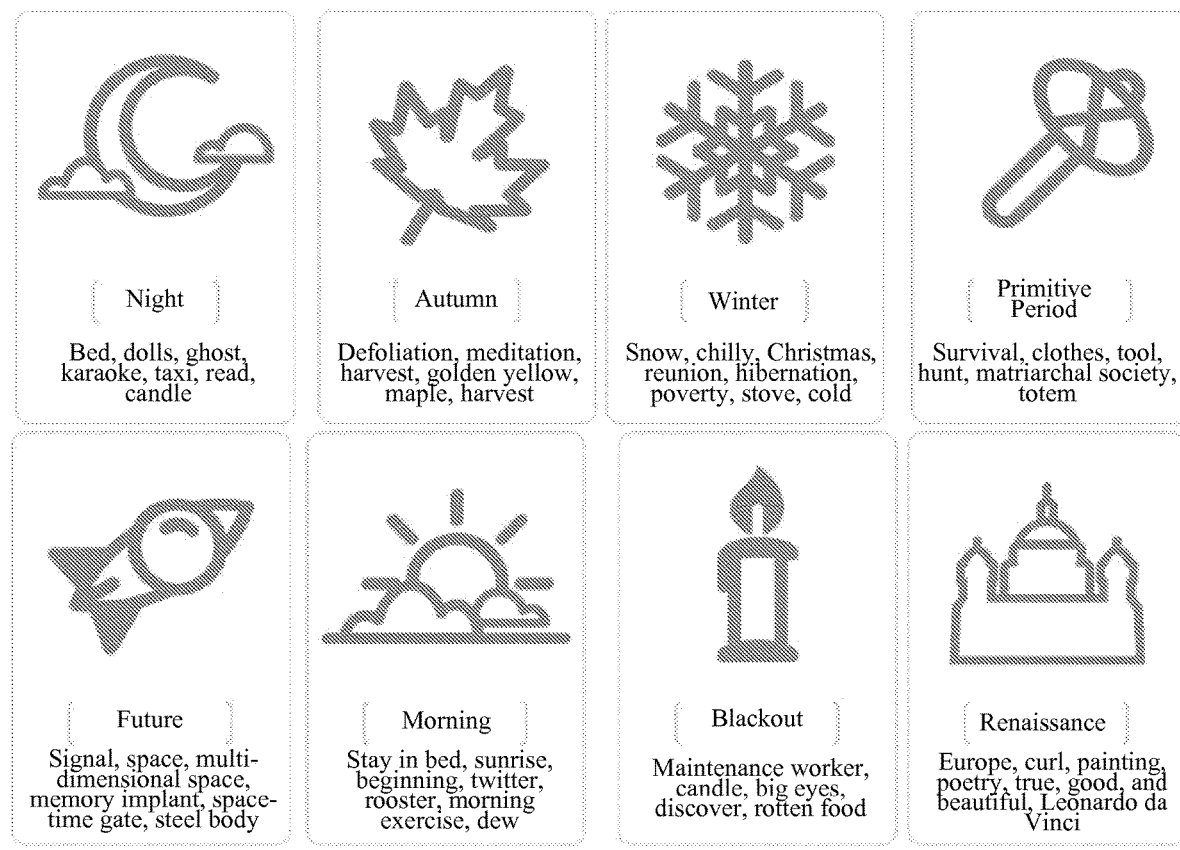

Referring to FIG. 2, one of the dimensionality e-cards displayed on the terminal device can have a dimensionality type of "event". The dimensionality e-card includes exemplary graphic information 202 and text information 204. The graphic information 202 contains the graphic 202a corresponding to the dimensionality type "event". For example, the graphic 202a can be an icon used for identifying a short message to stimulate imaginations. The text information 204 can include a word group 204a corresponding to the graphic 202a and indicative words 204b corresponding to the word group 204a. For example, "the word group 204a" can be "a short message", while the indicative words 204b can include "express, inform, assault, stranger, insomnia, and holiday greetings". In other embodiments, the indicative words 204b can further include other words without limiting to the words depicted in FIG. 2.

In one embodiment, the first type e-card is stored in an image format. Each first type e-card corresponds to an identifier (ID) for uniquely identifying this first type e-card. The identifier (ID) can be an ID number pre-assigned to each first type e-card, or can be a value obtained from calculation (e.g., by Hash algorithm) of each first type e-card, or can be a name with uniqueness for the each first type e-card.

Further, the first type e-card can be locally stored in the terminal device. After receiving the task starting instruction, the task starting interface 102 can then obtain the first type e-card from the local storing path. Alternatively, the first type e-card can be stored in a server, the task starting interface 102 can then pull the first type e-card from the server through a network after receiving the task starting instruction.

In one embodiment, the graphic can correspond to a dimensionality type of "character" and can include at least one of the graphics indicating gender, model group, occupation, age, emotion, human nature weaknesses, and good quality. For example, the graphic for indicating the gender can include at least one of the graphics indicating man and woman. The graphic for indicating the model group can include at least one of the graphics indicating otaku, white-rich-beauty, and north drifter. The graphic for indicating the occupation can include at least one of the graphics indicating civil servant (e.g., government employee), business white-collar worker, middle/high-school student, undergraduate student, and labor (or blue-collar) worker. The graphic for indicating the age can include at least one of the graphics indicating senior (or old people), middle-aged adult, child, youth, and decedent. The graphic for indicating the emotion can include at least one of the graphics indicating happy, angry, sorrow, and cheerful. The graphic for indicating the human nature weaknesses can include at least one of the graphics indicating gluttonous, greedy, lazy, and arrogant. The graphic for indicating the good quality can include at least one of the graphics indicating modesty, sharing happily, kindness, bravery, and persistence.

In one embodiment, the graphic can correspond to a dimensionality type of "object" and can include at least one of the graphics indicating: man-made object and nature object. For example, the graphic for indicating the man-made objects can include at least one of the graphics indicating electronic devices (e.g., mobile phones, televisions, computers, etc.) and living goods (e.g., wallets, eyeglasses, watches, aircrafts, lights, cabinets, etc.). The graphic for indicating nature objects can include at least one of the graphics indicating weather (e.g., wind, thunder, rain, lightening, etc.), living creature (e.g., flowers, fishes, rabbits, etc.), natural object (e.g., water, fire, earth, star, sun, moon, etc.) and morphology (e.g., hardness, softness, smoothness, layering, etc.).

In one embodiment, the graphic can correspond to a dimensionality type of "event" and can include at least one of the graphics indicating daily performance, natural phenomenon, cultural phenomenon, device function, and physical behavior (or act of limb). For example, the graphic for indicating daily performance can include at least one of the graphics indicating eating, wearing, living, and outing. The graphic for indicating natural phenomena can include at least one of the graphics indicating temperature, humidity, space position, distance (e.g., far/near and high/low), and sound level (e.g., strong/weak). The graphic for indicating cultural phenomena can include at least one of the graphics indicating chivalry, Renaissance, angry youth, poems and jokes. The graphic for indicating the device function can include at least one of the graphics indicating photography, recording, music, image video, and time. The graphic for indicating physical behavior can include at least one of the graphics indicating plucking, shaking, blowing, sliding, rotating and twisting.

In one embodiment, the graphic can correspond to a dimensionality type of "place" and can include at least one of the graphics indicating situation scene and geographic position (or orientation). For example, the graphic for indicating situation scene can include at least one of the graphics indicating in the aerospace, office, home, car, travel, class and party. The graphic for indicating geographic position can include at least one of the graphics indicating Middle East, America, Europe, Africa, Antarctica, and Japan.

In one embodiment, the graphic can correspond to a dimensionality type of "time" and can include at least one of the graphics indicating season, daily time period, and ancient dynasties. For example, the graphic for indicating the season can include at least one of the graphics indicating spring, summer, autumn and winter. The graphic for indicating the daily time period can include at least one of the graphics indicating morning, noon, and night. The graphic for indicating the ancient dynasties can include at least one of graphics indicating Qing Dynasty, Primitive Period, and faraway future.

It should be noted that, although the dimensionality e-card can include exemplary five types of dimensionality (e.g., character, object, event, time, and place), these exemplary five types of dimensionality are disclosed as a method of exhaustive thinking and anything can be considered as one of the five types of dimensionality. Although the above-mentioned embodiments provide exemplary graphic(s) of each type of dimensionality, any other suitable graphic(s) can also be encompassed in accordance with various embodiments. In other embodiments, the above discussed graphics can also be used to indicate other meanings, that is, the graphic type of each dimensionality can be extended, and each graphic type of each dimensionality further can be extended. For example, in the graphics corresponding to the dimensionality of object, the graphics showing the electronic device further can be the graphics showing personal digital assistants, tablets; in the graphics corresponding to the dimensionality of event, the graphics showing the cultural phenomenon further can be the graphics showing tea ceremony, calligraphic.

In an exemplary embodiment, the graphic corresponding to the dimensionality type of "character" (or person) can include at least one of the graphics indicating baby, the decedent, old men, women, the blind, pregnant women, and labor (or blue-collar) worker. The graphic corresponding to the dimensionality type of "object" can include at least one of the graphics indicating lamp, watch, flower, star, clothes, picture, thunder, fish, parrot, water, fire, music, moon, cactus and octopus. The graphic corresponding to the dimensionality type of "event" can include at least one of the graphics indicating short message, color, recording, dance, fall in love, anger, greed, sharing, flipping, twisting, temperature, elevation, sleep, exercise, and shopping. The graphic corresponding to the dimensionality type of "place" can include at least one of the graphics indicating Africa, Antarctica, aerospace, gathering, Japan, airport, rest-room, and school. The graphic corresponding to the dimensionality type of "time" can include at least one of the graphics indicating night, autumn, winter, Primitive Period, future, morning, blackout (power outage), and the Renaissance.

Referring to FIG. 3A-3E, the dimensionality e-card of "character" dimensionality type includes eight exemplary dimensionality e-cards indicating baby, decedent, senior (old people), man, women, pregnant women, blind, and labor (or blue-collar) workers. The dimensionality e-card of "object" dimensionality type includes fifteen exemplary dimensionality e-cards indicating light, watch, flower, stars, clothes, picture, thunder, fish, parrot, water, fire, music, moon, cactus and octopus. The dimensionality e-card of "event" dimensionality type includes fifteen exemplary dimensionality e-cards indicating short message, color, record, dance, fall in love, anger, greedy, share, bounce, twist, temperature, altitude, sleep, sport, and shopping. The dimensionality e-card of "place" dimensionality type includes eight exemplary dimensionality e-cards showing Africa, Antarctica, outer space, party, Japan, airport, toilet, and "go to school". The dimensionality e-card of "time" dimensionality type includes eight exemplary dimensionality e-cards showing night, autumn, winter, Primitive Period, future, morning, power outage and the Renaissance.

Each dimensionality e-card can include the graphic information corresponding to the dimensionality type and the text information corresponding to the graphic information. The text information includes the word group corresponding to the graphic and the indicative words corresponding to the related word group. In an example shown in FIG. 3B having a dimensionality e-card indicating "picture", the graphic can be an icon used to identify an image in the Internet, the related word group can be "picture", and the indicative words can be "group photo, repeatedly modified, photo album, memories, travel, and photographer". It is noted that, content of the indicative words corresponding to the word group can be altered according to specific requirements, e.g., by deleting or modifying existing words and/or adding new words.

It is noted that, the first type e-cards provided by various embodiments are not limited to the 54 exemplary dimensionality e-cards depicted in FIGS. 3A-3E, new dimensionality e-cards can be added, and existing dimensionality e-cards can be deleted and/or modified.

Figure 4A:
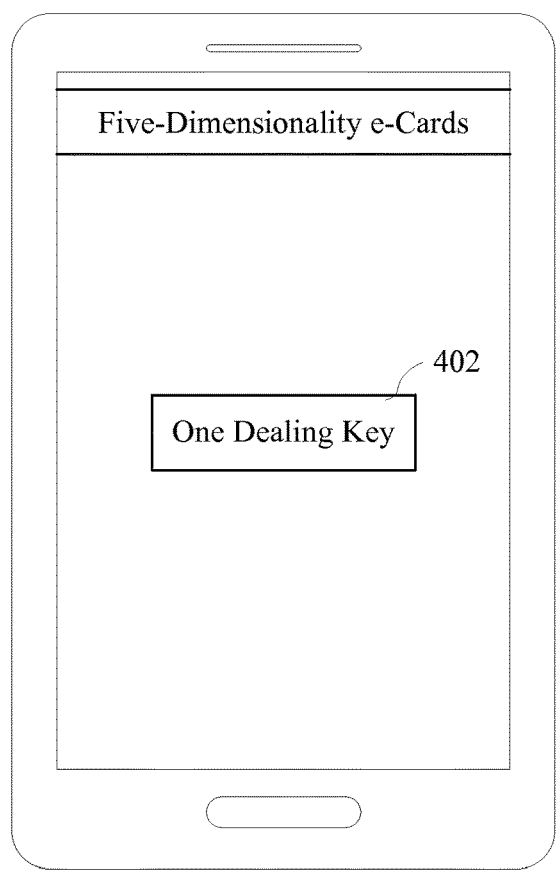
FIG. 4A depicts an exemplary task starting button consistent on a terminal device with various disclosed embodiments.

In one embodiment, a task starting button can be set on an operating interface of the terminal device. The task starting instruction can be triggered by pressing the task starting button. Referring to FIG. 4A, the task starting instruction can be triggered by pressing a button 402 of "one dealing key". After receiving the task starting instruction, the task starting interface 102 can obtain a first type e-card having at least one dimensionality type locally from the terminal device or from the server. In addition, the graphic displaying interface 104 can display the obtained first type e-card according to a pre-set animation. For example, the graphic displaying interface 104 can display the obtained first type e-card through a simulative animation that multiple e-cards entering from a certain direction or various different directions.

Figure 4B:
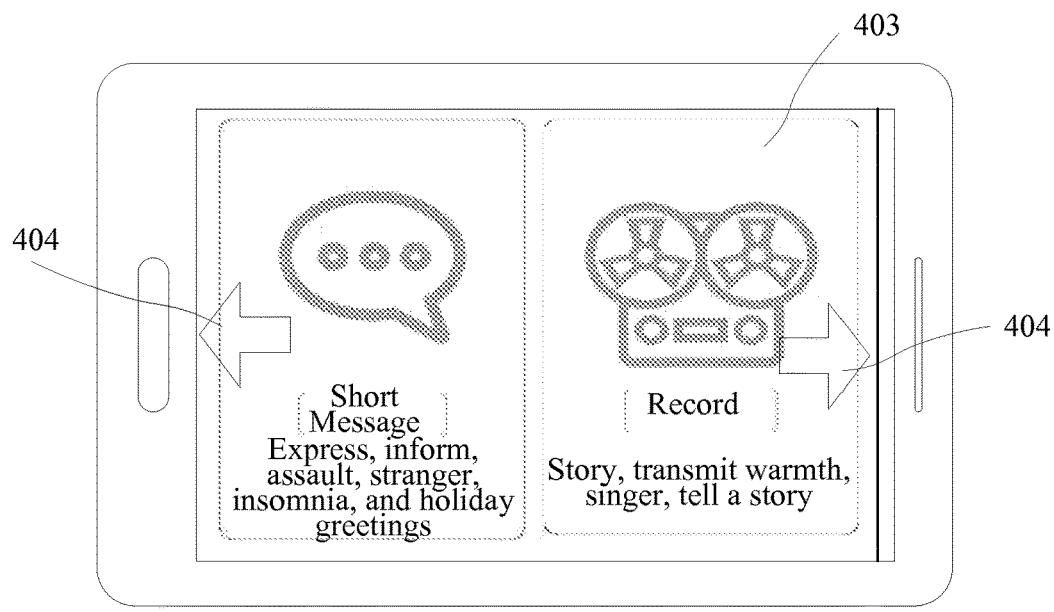
FIG. 4B depict displaying of exemplary first type e-cards consistent with various disclosed embodiments.

Further, the graphic displaying interface 104 can be configured to realize operations of moving, adjusting size, and overturning of the displayed first type e-card. For example, for a terminal device having a touch screen, two fingers can be used to stretch or shrink the displayed first type e-card to randomly or arbitrarily adjust the size of the first type e-card, such that the graphic displaying interface 104 can simultaneously display multiple first type e-cards. In addition, the graphic displaying interface 104 can further display a control widget for left and right arrows. By clicking the left and right arrows, the first type e-cards can be switched. As shown in FIG. 4B, the graphic displaying interface 104 can list-display multiple first type e-cards 403. By clicking the control widget 404 of left and right arrows, another group of multiple first type e-cards 403 can be switched and displayed.

Figure 4C:
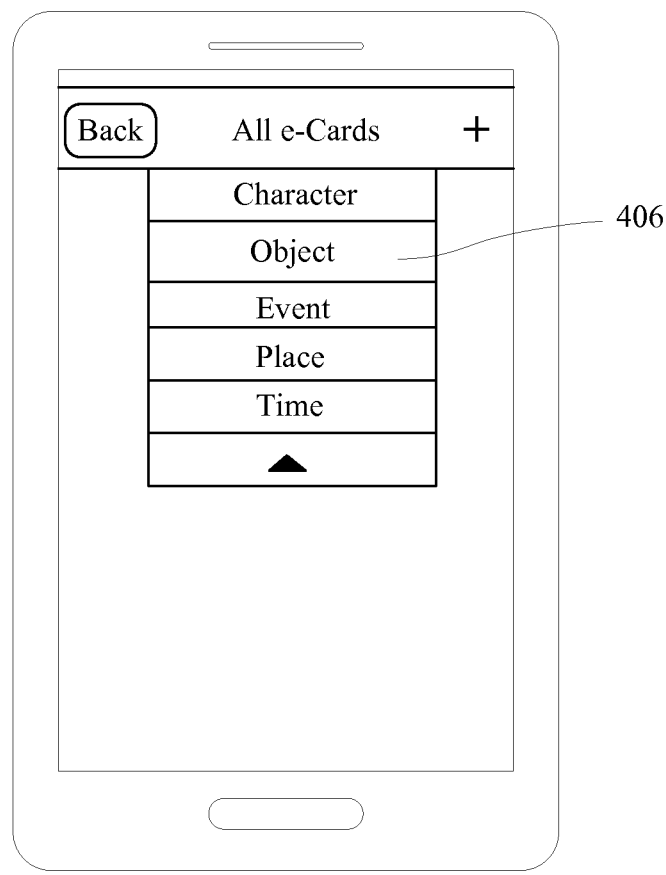
FIG. 4C depicts displaying of exemplary first type e-cards having at least one dimensionality type consistent with various disclosed embodiments.

In one embodiment, the graphic displaying interface 104 can further be configured to display at least one dimensionality type of the first type e-cards, to receive a dimensionality type appointed by a user, and to display the first type e-cards having the appointed dimensionality type. In one embodiment, as each dimensionality type corresponds to multiple dimensionality e-cards (as depicted in FIGS. 3A-3E), the graphic displaying interface 104 can display multiple dimensionality types. As shown in FIG. 4C, the graphic displaying interface 104 can display different dimensionality types through a menu item 406. By clicking on a dimensionality type on the menu item 406, dimensionality e-card(s) corresponding to the clicked dimensionality type can be displayed. When menu items corresponding to all of the first type e-cards are clicked thereon, the graphic displaying interface 104 can display all of the dimensionality e-cards.

Further, the terminal device for developing originality can further include a storage device (e.g., a non-transitory computer-readable storage medium) configured to store the first type e-cards containing at least one dimensionality type. The first type e-card(s) of each dimensionality type can be stored in a path corresponding to the dimensionality type. Referring back to FIG. 4C, when clicking on the menu item 406 corresponding to a different dimensionality type, a first type e-card can be obtained from a path corresponding to the dimensionality type and displayed.

In one embodiment, the graphic displaying interface 104 is further configured to receive a selecting instruction with respect to the first type e-cards from a user. According to the selecting instruction, the selected first type e-cards can be identified having a selected status. As the dimensionality e-cards under each dimensionality type may have a big amount, the user usually needs to select the dimensionality e-cards from different dimensionality types. When receiving the selecting instruction with respect to the dimensionality e-cards, for example when a user clicks on a certain displayed dimensionality e-card through the touch screen, the graphic displaying interface 104 can identify the dimensionality e-card in the storage to have a selected status. The graphic displaying interface 104 can set a shadow for the selected dimensionality e-card. When clicking the dimensionality e-card for a second time, the selected status can be cancelled.

Figure 4D:
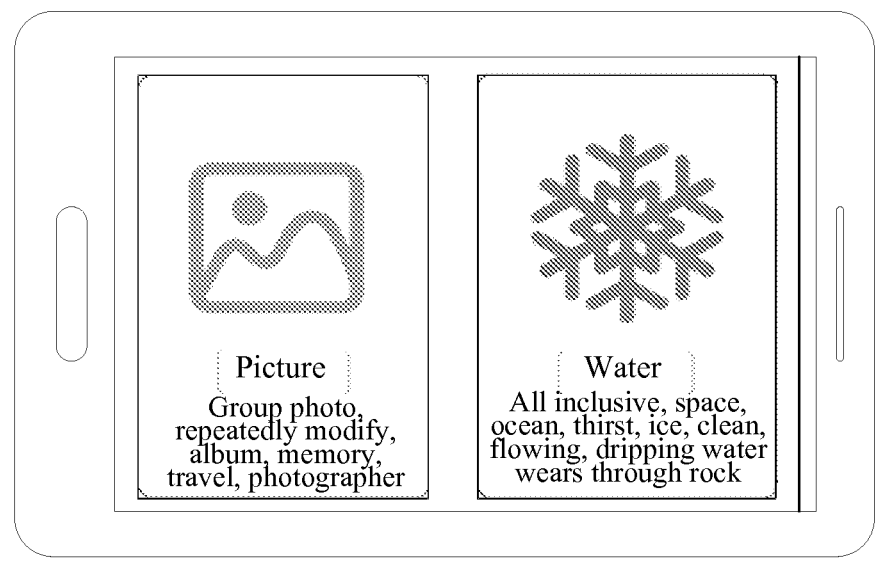
FIG. 4D depicts an exemplary method for correlating selected first type e-cards consistent with various disclosed embodiments.

Further, in one embodiment, the task starting interface 102 is further configured to receive a task starting instruction; according to the task starting instruction, to obtain the first type e-card(s) which are identified with a selected status. The graphical displaying interface 104 is further configured to display the first type e-card(s) which are identified with a selected status. Referring to FIG. 4D, the user selects the dimensionality e-card of "picture" under the dimensionality type of "object", and selects the dimensionality e-card of "winter" under the dimensionality type of "time". After the task starting instruction is executed, the graphical displaying interface 104 displays the dimensionality e-card of "picture" and the dimensionality e-card of "winter" for the user to think correlatedly with each other.

Various methods can be pre-set to correlate dimensionality e-cards, displayed and identified as selected status to generate originality. Such pre-set methods can include, but be not limited to, a replacing function, a combining function, and/or an associating function for related scenarios. The replacing function can refer to using a new behavior to replace an old behavior to accomplish a goal. For example, a mobile phone is used to make phone calls. However, the mobile phone can also be used to smash and very effectively smash a walnut and the mobile phone thus becomes a new tool. The combination function can refer to combination of two (or more) functions to have one of the two (or more) functions more satisfy the user's requirements. For example, a hard disk and WIFI technology can be combined to form a wireless hard disk as a new production, which can be attractive to users who want to extend hard disk capacity but do not want to reduce the operating speed. The associating function for related scenarios can refer to associating the scenarios from daily life, and integrating the daily performance into a design. For example, when abnormal TV signal occurs, some people may physically pat the TV to recover the signal. Such intuitive behavior (e.g., physically patting) may be integrated into an unlocking action of a mobile phone, which may provide a more natural and effective design.

Referring to FIG. 4D, the graphic displaying interface 104 displays two exemplary dimensionality e-cards (or first type e-cards) identified with selected status. When using the disclosed methods for correlating the two dimensionality e-cards, for example, by associating related scenarios on the two dimensionality e-cards as shown in FIG. 4D, context information can be generated including, for example, "in a chilly winter and inside a room, the window glass is always covered by a layer of white vapor. Only after this layer of white vapor is erased, the great view outside of the window can be seen. Isn't this process like looking up pictures?" The inputting interface receives the context information inputted by the user according to the correlation. In addition, according to such context information, the user can further be motivated to generate additional originalities including "blurred pictures" and to obtain a new picture application, for example. In the newly obtained picture application, when looking up a picture, a fuzzy status (e.g., a "vapor") can be set as a default status. Only after the picture is physically wiped by finger(s), the picture behind the "vapor" can be seen.

The disclosed terminal device for developing originality can be used to randomly select multiple dimensionality e-cards from multiple dimensionality types to combine multiple dimensionality e-cards from a same dimensionality type or from different dimensionality types, so as to stimulate various kinds of leaping originality to generate all kinds of context information and to improve efficiency of product designs.

In one embodiment, the inputting interface 106 is further configured to receive an amount of the first type e-cards of each dimensionality type inputted by the user, and according to the amount of the first type e-cards of each dimensionality type, to select at least two e-cards from the first type e-cards. Specifically, before triggering the starting of the task, the amount of dimensionality e-cards to be selected from each dimensionality can be set through the graphic displaying interface 104. For example, it can be set to select one e-card for the "character" dimensionality type, to select two e-cards for the "event" dimensionality type, and/or select a suitable number of e-cards for other suitable dimensionality type(s). After receiving the amount for selecting first type e-card(s) of the dimensionality type(s) inputted by the user, the inputting interface 106 can randomly select the dimensionality e-card(s) from corresponding dimensionality type(s) and the graphic displaying interface 104 can display the selected dimensionality e-card(s).

Figure 5:
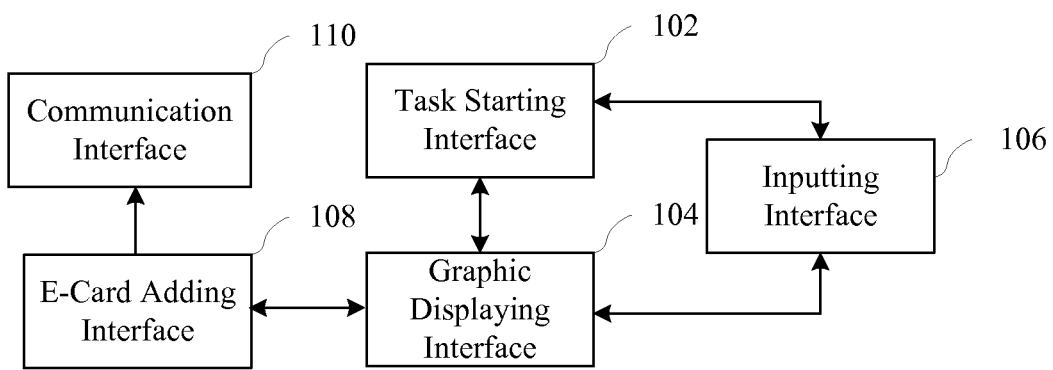
FIG. 5 depicts an exemplary terminal device for developing originality to design a network application product consistent with various disclosed embodiments.

In one embodiment, referring to FIG. 5, the terminal device for developing originality further includes an e-card adding interface 108. The e-card adding interface 108 is configured to receive an operating instruction for a first pre-set area, and according to the operating instruction of the first pre-set area, to display a graphical inputting interface, and through the graphical inputting interface to receive graphic information inputted by the user. The e-card adding interface 108 is further configured to receive an operating instruction for a second pre-set area, and according to the operation instruction of the second pre-set area, to display a text inputting interface, and through the text inputting interface, to receive text information inputted by the user, and to generate an e-card according to the graphic information and the text information.

Figure 6A:
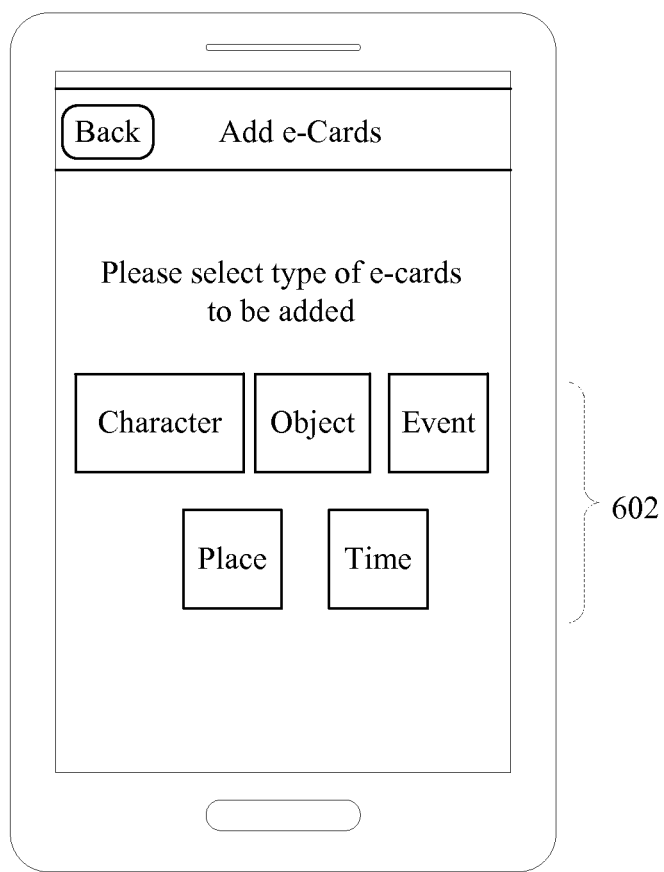
FIGS. 6A-6B depict an exemplary interface for adding e-cards consistent with various disclosed embodiments.
Figure 6B:
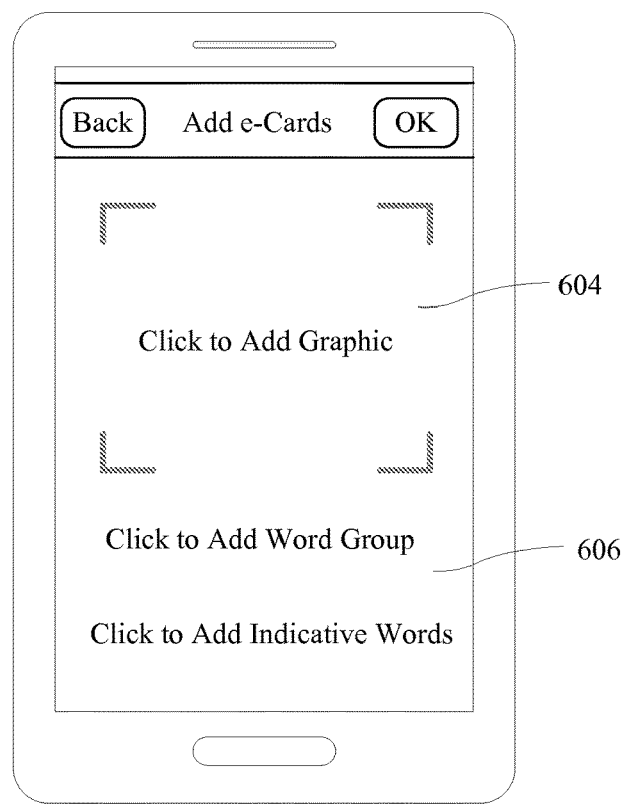
Figure 6C:
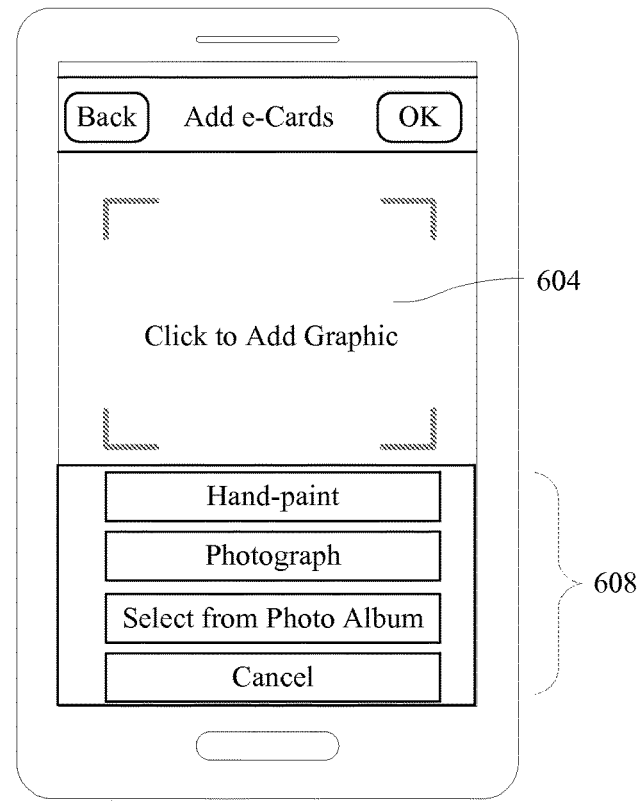
FIG. 6C depicts an exemplary graphic inputting interface consistent with various disclosed embodiments.
Figure 6D:
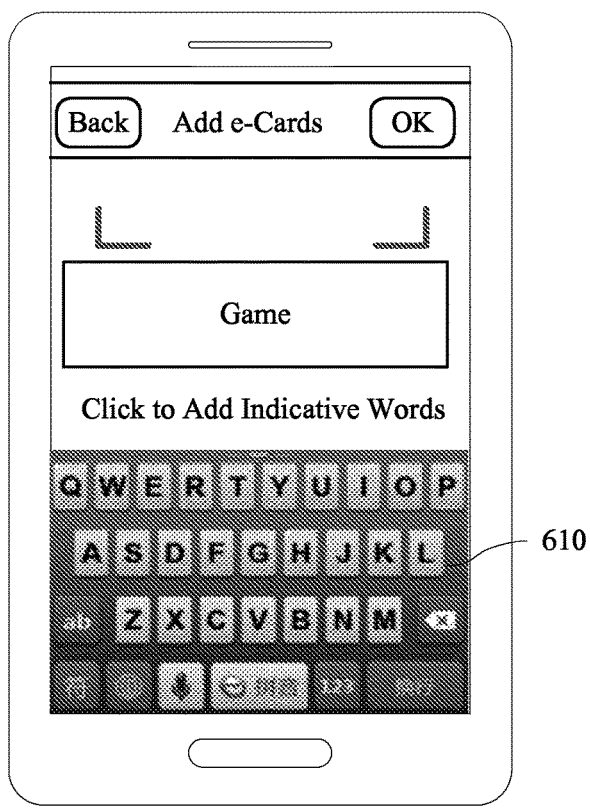
FIG. 6D depicts an exemplary text inputting interface consistent with various disclosed embodiments.

In one embodiment, additional e-card(s) can be added as desired, for example, corresponding to certain dimensionality type(s). In some cases, additional e-card(s) can be added as desired without corresponding to any dimensionality type(s). The added e-card(s) can then be referred to as customized e-card(s) and stored in a separate path individually for the customize e-card(s). Referring to FIG. 6A, a dimensionality type corresponding to a dimensionality e-card to be added can be selected. For example, when clicking to enter dimensionality type options 602 in FIG. 6A, a corresponding adding interface (e.g., referring to FIG. 6B) can be entered. In addition, as shown in FIG. 6B, when an e-card adding interface 108 receives an operating instruction for the first pre-set area 604 (e.g., by a clicking operation on the first pre-set area 604), a graphic inputting interface (e.g., referring to FIG. 6C) can be displayed. On the graphic inputting interface, graphic inputting menu options 608 can be displayed. Through the graphic inputting menu options 608, graphics (e.g., including images/pictures) can be added by hand-painting, photographing, and/or selecting from photo album as shown in FIG. 6C. When the e-card adding interface 108 receives the operating instruction for a second pre-set area 606 (e.g., referring to FIG. 6B), e.g., by a clicking operation on the second pre-set area 606, a text inputting interface can be displayed as shown in FIG. 6D. Through the text inputting interface 610, text including word group(s) and indicative words can be inputted.

In one embodiment, after the terminal device generates new e-card(s), the new e-card(s) can be locally stored and/or uploaded to the server for storing in the server. Each newly added e-card (e.g., which may be different from a dimensionality e-card, a formula e-card, etc.) can corresponded to a unique ID for other terminal devices to download. As such, the e-card(s) can be expanded. When selecting the e-card(s), the user can desirably add customized e-card(s), which can be displayed as selected e-card(s) such that the first type e-cards provided for selecting therefrom can be more abundant. This can facilitate to stimulate originality and improve efficiency for product design.

In one embodiment, the task starting interface 102 is further configured to obtain a second type e-card according to the task starting instruction. The second type e-card contains a formula sign corresponding to a pre-set method and text information corresponding to the formula sign. The inputting interface 106 is configured to select the at least two first type e-cards from the plurality of first type e-cards according to the inputting instruction, and to select at least one second type e-card from a plurality of second type e-cards.

In various embodiments, second type e-cards can be included to have formula signs such as, for example, "plus (+)", "multiply (−)", "what (what)", "what place (where)", "what time (when)", "what role (who)", "reason (why)", and "how to handle (how)". Text information corresponding to the formula sign includes annotation text corresponding to the formula sign and explanation (specification) text of the pre-set methods. The second type e-card can also be referred to as "formula e-card".

Figure 7:
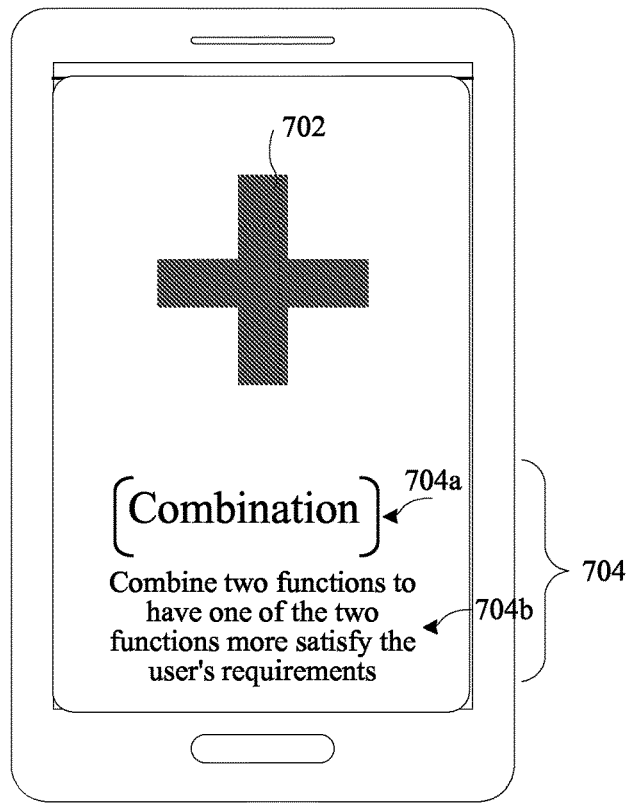
FIG. 7 depicts an exemplary second type e-card consistent with various disclosed embodiments.

Referring to FIG. 7, an exemplary formula e-card is an e-card indicating "plus (+)", which has a formula sign 702 (e.g., "+" in the example of FIG. 7) and text information 704 corresponding to the formula sign. The text information 704 includes the annotation text 704*a* (such as "combination" in FIG. 7) corresponding to the formula sign 702 and the explanation text 704*b* of the pre-set methods (including the replacing function, the combining function, and/or the associating function for related scenarios as discussed above, for example, "combination" in FIG. 7 can be a combination of two functions to have one of the two functions more satisfy the user's requirements). In other embodiments, the explanation text 704*b* can further include sentence(s) showing similar meanings without limiting to the text content depicted in FIG. 7.

The formula e-cards can define a method. Information on the formula e-cards including the formula sign, the annotation text, and the explanation text can provide a method or a combination method for the selected dimensionality e-cards. Of course, corresponding annotation text and the explanation text of the method are not limited to any unchangeable contents but can be modified according to specific requirements. In one embodiment, the formula e-card is not limited to the above-mentioned formula signs, new formula e-cards can be added, while existing formula e-cards can be deleted or modified. In other words, the amount and type of the used method can be altered according to the specific requirements.

In one embodiment, the inputting interface 106 can further be configured to select at least one e-card from a plurality of formula e-cards according to the inputting instruction. The graphic displaying interface 104 can display the selected dimensionality e-card(s) and the selected formula e-card(s). The user can use the formula sign on the formula e-card to correlate dimensionality e-cards to stimulate originality to form brain storming, and to improve efficiency of product design.

In one embodiment, the terminal device for developing originality further includes a communication interface 110 configured to send the context information to a server (or to another terminal device) and configured to send the first type e-card(s) to the server (or to another terminal device) and to receive the first type e-card(s) from the server (or from another terminal device).

As disclosed, the terminal device receives the context information inputted by the user, and uses the communication interface 110 to send the context information to the server (and/or to another terminal device) to share the originality. In addition, the terminal device can use the communication interface 110 to send the first type e-card(s) to the server (and/or to another terminal) to share the e-card(s) to facilitate to stimulate originality.

Figure 8:
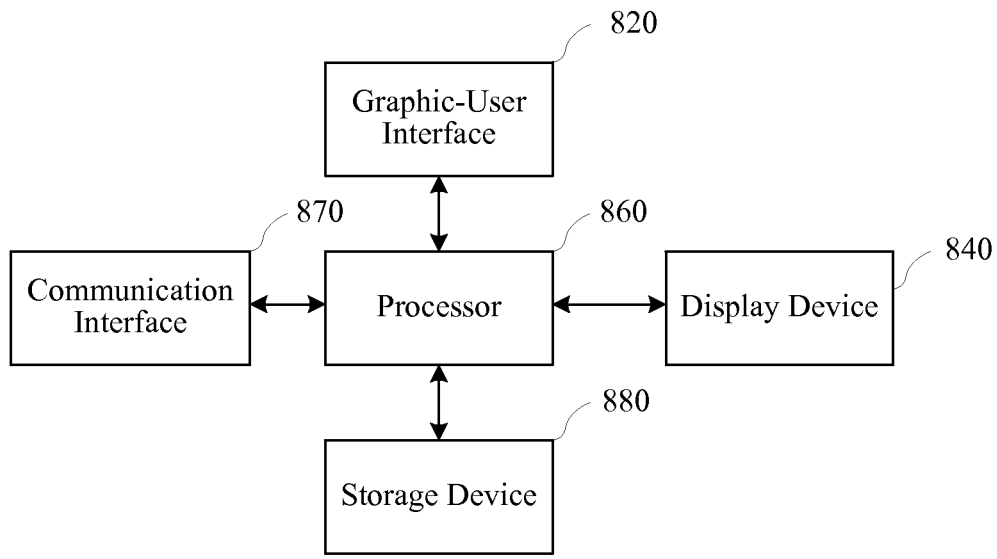
FIG. 8 depicts another exemplary terminal device for developing originality to design a network application product consistent with various disclosed embodiments.

Referring to FIG. 8, in one embodiment, an exemplary terminal device for developing originality includes a graphic-user interface 820, a display device 840, a processor 860, a storage device 880, and a communication interface 870.

The graphic-user interface 820 is configured to receive a task starting instruction to obtain a plurality of first type e-cards having at least one dimensionality type, according to the task starting instruction, wherein each first type e-card of the plurality of first type e-cards contains graphic information corresponding to a dimensionality type and text information corresponding to the graphic information. The display device 840 is configured to display the plurality of first type e-cards. The processor 860 is configured to receive an inputting instruction to select at least two first type e-cards from the plurality of first type e-cards according to the inputting instruction. The storage device 880 is configured to store the plurality of first type e-cards. In one embodiment, the graphic-user interface 820 is further configured to receive context information inputted by a user, and the context information is generated by correlating information including the graphic information and the text information on the at least two first type e-cards.

In one embodiment, the display device 840 is further configured to display a first type e-card having the at least one dimensionality type, and to receive a dimensionality type appointed by the user, and to display one or more first type e-cards having the dimensionality type appointed by the user.

In one embodiment, the display device 840 is further configured to receive a selecting instruction from the user for selecting from the one or more first type e-cards having the dimensionality type appointed by the user, and to identify a selected first type e-card with a selected status according to the selecting instruction.

In addition, in one embodiment, the graphic-user interface 820 is further configured to receive the task starting instruction, and to obtain the selected first type e-card identified with the selected status according to the task starting instruction. The display device 840 is further configured to display the selected first type e-card identified with the selected status.

In one embodiment, the processor 860 is further configured to receive an amount of first type e-cards in each dimensionality type, and to select the at least two first type e-cards from the plurality of first type e-cards according to the amount inputted by the user.

In one embodiment, the at least one dimensionality type includes a character dimensionality type, an object dimensionality type, an event dimensionality type, a time dimensionality type, and/or a place dimensionality type.

In one embodiment, the graphic-user interface 820 is configured to receive an operating instruction for a first pre-set area, and according to the operating instruction of the first pre-set area, to display a graphical inputting interface, and through the graphical inputting interface to receive graphic information inputted by the user. The graphic-user interface 820 is further configured to receive an operating instruction for a second pre-set area, and according to the operation instruction of the second pre-set area, to display a text inputting interface, and through the text inputting interface, to receive text information inputted by the user. The processor 860 is further configured to generate an e-card according to the graphic information and the text information.

In one embodiment, the graphic-user interface 820 is further configured to obtain a second type e-card according to the task starting instruction, the second type e-card containing a formula sign corresponding to a pre-set method and text information corresponding to the formula sign. The processor 860 is further configured to select the at least two first type e-cards from the plurality of first type e-cards according to the inputting instruction, and to select at least one second type e-card from a plurality of second type e-cards.

In one embodiment, the communication interface 870 is configured to send the context information to a server (and/or another terminal device); and configured to send the first type e-card to the server (and/or to another terminal device), and to receive the first type e-card from the server or from another terminal device.

Figure 9:
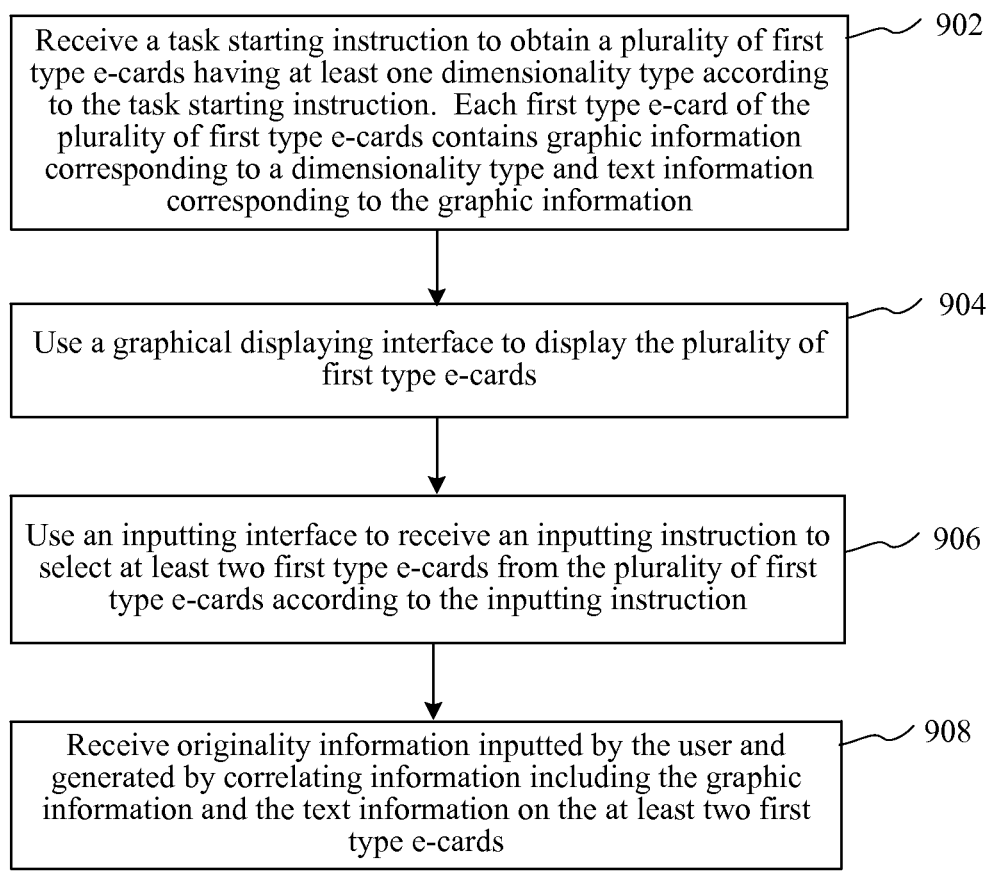
FIG. 9 depicts an exemplary method for developing originality to design a network application product consistent with various disclosed embodiments.

In one embodiment, referring to FIG. 9, a method is provided for developing originality. The method can be implemented by a terminal device. The terminal device may include, but be not limited to, desktop computers (PCs), laptop portable computers, personal digital assistants (PDAs), tablet computers, smart phones, e-book readers, MP3 (Moving Picture Experts Group Audio Layer III) players, MP4 (Moving Picture Experts Group Audio Layer IV) players, POS terminals, and/or car-carried computers.

In Step 902, a task starting instruction is received to obtain a plurality of first type e-cards having at least one dimensionality type according to the task starting instruction. Each first type e-card of the plurality of first type e-cards contains graphic information corresponding to a dimensionality type and text information corresponding to the graphic information.

For example, after receiving the task starting instruction, the terminal device obtains a plurality of first type e-cards, or pulls from the server to obtain a plurality of first type e-cards when the e-cards are not locally stored. In one embodiment, the at least one dimensionality type includes a character dimensionality type, an object dimensionality type, an event dimensionality type, a time dimensionality type, and/or a place dimensionality type. The first type e-card can thus be referred to as a dimensionality (type) e-card. The text information on each first type e-card can include a word group (or a group of words) corresponding to the feature graphic and/or indicative words corresponding to the word group.

In Step 904, a graphical displaying interface is used to display the plurality of first type e-cards.

In Step 906, an inputting interface is used to receive an inputting instruction to select at least two first type e-cards from the plurality of first type e-cards according to the inputting instruction.

Various selecting method may be included. For example, a selecting method can include randomly selecting one e-card for each dimensionality type; or having to select one dimensionality e-card for a certain/designated dimensionality type and also randomly selecting another dimensionality e-card; or randomly selecting at least two dimensionality e-cards from different dimensionality types. It is noted that, the method of (randomly) selecting e-card(s) can be configured according to the specific requirements.

In one embodiment, in Step 906, an amount of first type e-cards in each dimensionality type inputted by the user can be received. The at least two first type e-cards can be selected from the plurality of first type e-cards according to the amount.

In Step 908, context information inputted by the user and generated by correlating information including the graphic information and the text information on the at least two first type e-cards can be received.

In one embodiment, after selecting the at least two first type e-cards, the selected e-cards can be displayed through the graphic displaying interface. According to at least one pre-set method, the user can correlate the displayed at least two first type e-cards to generate context information and to input the context information through the inputting interface.

Figure 10:
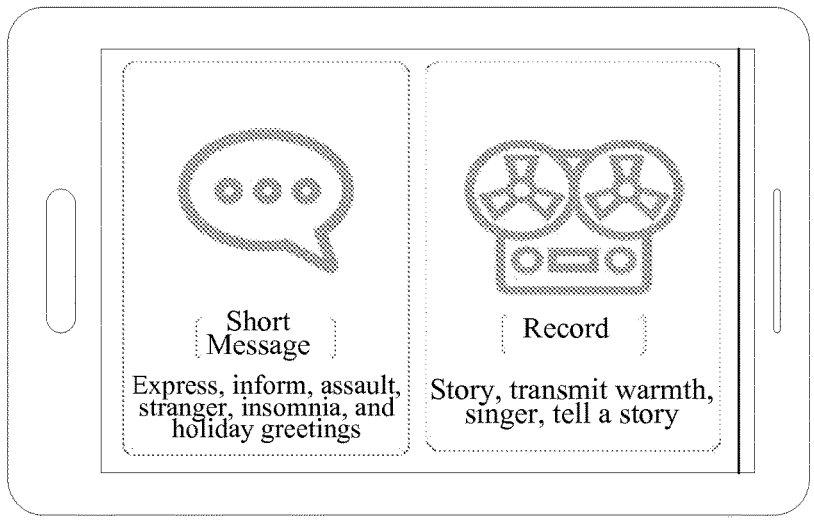
FIG. 10 depicts an exemplary method for correlating selected dimensionality e-cards consistent with various disclosed embodiments.

FIG. 10 depicts an exemplary method for correlating selected dimensionality e-cards in accordance with various disclosed embodiments. As shown a "record" dimensionality e-card can be selected from the "event" dimensionality type e-cards, a "short message" dimensionality e-card can be selected from the "event" dimensionality e-cards. These two e-cards can be displayed through a graphic displaying interface, and the above-mentioned method of the combining function can be used for correlating these two dimensionality e-cards to form context information, such as "we get used to transmit simple information through the short message; it is however a troublesome process for typing on a mobile phone; what if the mobile phone is used to transmit audio message instead of short text message, does it make communication more convenient and faster?" By inputting the context information through the inputting interface, originality can be stimulated from the context information by the designer and can include an instant messaging tool which correlates a recording function with a messaging function.

One embodiment can include using the graphical displaying interface to display the first type e-cards having the at least one dimensionality type; receiving a dimensionality type appointed by the user, and displaying one or more first type e-cards having the dimensionality type appointed by the user. In this embodiment, the dimensionality e-cards of each dimensionality type are stored in different paths and each dimensionality e-card has a unique ID. The graphic displaying interface can display the dimensionality type of the dimensionality e-cards through menu options, e.g., by clicking on the menu option(s) to obtain the dimensionality e-card corresponding to the dimensionality type and to display.

One embodiment can include using the graphical displaying interface to receive a selecting instruction from the user for selecting from the one or more first type e-cards having the dimensionality type appointed by the user, and to identify a selected first type e-card with a selected status according to the selecting instruction. In the embodiment, by clicking on the dimensionality e-cards of different dimensionality type, the selected dimensionality e-cards are identified using the selected status.

In addition, one embodiment can include receiving the task starting instruction and obtaining the selected first type e-card identified with the selected status according to the task starting instruction; and displaying the selected first type e-card identified with the selected status.

One embodiment can further include receiving an operating instruction for a first pre-set area, and according to the operating instruction of the first pre-set area, displaying a graphical inputting interface, and through the graphical inputting interface receiving graphic information inputted by the user on the first pre-set area; receiving an operating instruction for a second pre-set area, and according to the operation instruction of the second pre-set area, displaying a text inputting interface, and through the text inputting interface, and receiving text information inputted by the user. In the embodiment, the terminal device can further add the e-cards as desired. The generated e-cards can be locally stored in the terminal device and/or uploaded to the server. Other terminal devices can download the uploaded e-cards from the server for conveniently sharing the e-cards.

One embodiment can further include receiving the task starting instruction; obtaining a second type e-card according to the task starting instruction, the second type e-card containing a formula sign corresponding to a pre-set method and text information corresponding to the formula sign; using the inputting interface to select the at least two first type e-cards from the plurality of first type e-cards according to the inputting instruction and to select at least one second type e-card from a plurality of second type e-cards; and receiving context information inputted by the user and generated by correlating information comprising the graphic information and the text information on the at least two first type e-cards according to the selected at least one second type e-card.

The second type e-card can be referred to as a formula (type) e-card, the text information on each second type e-card can include annotation text corresponding to the formula sign and explanation/specification text corresponding to pre-set methods. After selecting at least one e-card from the formula e-cards and displaying the selected formula e-cards together with the dimensionality e-cards through the graphic displaying interface, the user can first process correlation thinking for the selected dimensionality e-cards according to the formula sign of the formula e-cards to form originality; then use the inputting interface provided by the terminal device to input the context information. The terminal device receives the context information inputted by the user and locally store the context information (and/or upload the context information to the server) for sharing through the communication interface.

Figure 11:
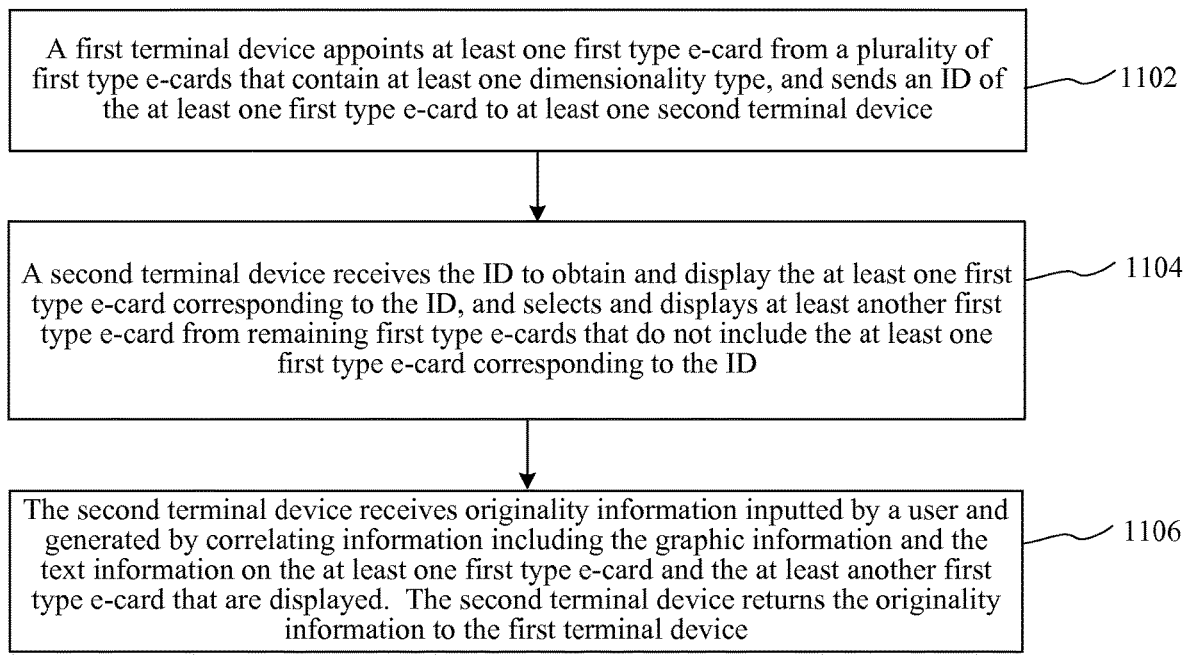
FIG. 11 depicts another exemplary method for developing originality to design a network application product consistent with various disclosed embodiments.

Referring to FIG. 11, in one embodiment, a method is provided for developing originality. The method is implemented by a terminal device. The terminal device may include, but be not limited to, desktop computers (PCs), laptop portable computers, personal digital assistants (PDAs), tablet computers, smart phones, e-book readers, MP3 (Moving Picture Experts Group Audio Layer III) players, MP4 (Moving Picture Experts Group Audio Layer IV) players, POS terminals, and/or car-carried computers.

In Step 1102, a first terminal device appoints at least one first type e-card from a plurality of first type e-cards that contain at least one dimensionality type, and sends an ID of the at least one first type e-card to at least one second terminal device. Each first type e-card of the plurality of first type e-cards contains graphic information corresponding to a dimensionality type of the each first type e-card and text information corresponding to the graphic information.

The first terminal device and the second terminal device indicate different terminal devices. The first type e-card is a dimensionality type e-card. The graphic information of each dimensionality e-card contains a (feature) graphic corresponding to the dimensionality type. The text information can include a word group (or a group of words) corresponding to the (feature) graphic and/or indicative words corresponding to the word group. In one embodiment, the at least one dimensionality type can include one or more dimensionality types including character (or person), object (or substance), event (or incident), time, place, etc. A corresponding relationship between each dimensionality e-card and the ID is stored on the server. The first terminal device can appoint an ID of at least one dimensionality e-card, and send the ID to at least one second terminal device.

In Step 1104, the second terminal device receives the ID to obtain and display the at least one first type e-card corresponding to the ID, and selects and displays at least another first type e-card from remaining first type e-cards that do not include the at least one first type e-card corresponding to the ID.

The second terminal device receives the ID of the dimensionality e-card appointed by the first terminal device, according to the ID, pulls a corresponding dimensionality e-card from the server, and selects at least one e-card from other dimensionality types. The at least one e-card selected from other dimensionality types can be obtained from the local of the second terminal device (and/or from the server by pulling). The selected dimensionality e-card is displayed together with the dimensionality e-card appointed by the first terminal device.

In Step 1106, the second terminal device receives context information inputted by a user and generated by correlating information including the graphic information and the text information on the at least one first type e-card and the at least another first type e-card that are displayed. The second terminal device returns the context information to the first terminal device.

In one embodiment, at least one of the pre-set methods can be used to process correlation thinking about the graphic information and text information on multiple first type e-cards displayed on the second terminal device to form originality. Related context information can be inputted to the second terminal device. When receiving the context information inputted by the user, the second terminal device can send the context information to the first terminal device. As such, the first terminal device can collect the context information returned from multiple second terminal devices for designing a product, the product designing efficiency is improved. In addition, the first terminal device can appoint at least one dimensionality e-card. For example, when conceiving a function related to a certain type baby product, the first terminal device can set the dimensionality e-card indicating "baby" as an appointed dimensionality e-card. In another example, when conceiving originality related to a certain image, the first terminal device can set the dimensionality e-card indicating "image" as an appointed dimensionality e-card.

In one embodiment, the exemplary terminal device for developing originality further includes the following processes. The second terminal device obtains a plurality of second type e-cards, and selects at least one second type e-card from the plurality of second type e-cards. Each of the plurality of second type e-cards contains a formula sign corresponding to a pre-set method and text information corresponding to the formula sign. The second terminal device receives context information inputted by a user and generated by correlating information including the graphic information and the text information on the at least one first type e-card and the at least another first type e-card according to the selected at least one second type e-card, and returns the context information to the first terminal device.

A second type e-card can be referred to as a formula (type) e-card. The text information on each second type e-card can include annotation text corresponding to the formula sign and explanation/specification text of the pre-set methods. In one embodiment, the second terminal can further select at least one formula e-card, according to the formula sign of the selected formula e-card, the user can process correlation thinking to the displayed dimensionality e-card to form the originality. The context information collected by the first terminal can be more abundant. The product designing efficiency can be improved.

In a certain embodiment, the disclosed terminal device can include a non-transitory computer-readable storage medium including instructions stored thereon. When being executed, the instructions cause the one or more processors in the terminal device to perform the disclosed method for designing a network application product, e.g., that can be used on a mobile terminal such as a smart phone.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with each other. In addition, exemplary devices are described with respect to corresponding methods.

The disclosed methods and/or devices can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods and/or devices can be implemented in a software manner. Of course, the methods and/or devices can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one apparatus (e.g., a processing unit) or configured in multiple apparatus as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods and/or devices. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Terminal devices and methods for designing a network application product are provided. A terminal device includes a task starting interface, a graphical displaying interface, an inputting interface. The task starting interface is configured to receive a task starting instruction to obtain a plurality of first type e-cards having at least one dimensionality type, according to the task starting instruction. Each first type e-card of the plurality of first type e-cards contains graphic information corresponding to a dimensionality type and text information corresponding to the graphic information. The graphical displaying interface is configured to display the plurality of first type e-cards. The inputting interface is configured to receive an inputting instruction to select at least two first type e-cards from the plurality of first type e-cards according to the inputting instruction. The inputting interface is further configured to receive context information inputted by a user and the context information is generated by correlating information including the graphic information and the text information on the at least two first type e-cards.

The disclosed terminal devices and method for designing a network application product can be used to randomly select multiple dimensionality e-cards from multiple dimensionality types to combine multiple dimensionality e-cards from a same dimensionality type or from different dimensionality types, so as to stimulate various kinds of leaping originality to generate all kinds of context information and to improve efficiency of product designs.

What is claimed is:

1. A method for displaying e-card by a terminal device, comprising:
    displaying an instruction receiving interface;
    receiving a task starting instruction inputted by a user through the instruction receiving interface;
    displaying at least two information e-cards and at least one formula e-card based on the task starting instruction, wherein the at least two information e-cards each include a corresponding dimensionality type, and the at least one formula e-card includes a formula sign corresponding to a pre-set formula and a formula text corresponding to the formula sign;
    displaying a selecting interface for the user to select a first information e-card and a second information e-card from the at least two information e-cards and to select a formula e-card from the at least one formula e-card, wherein the first information e-card includes first graphic information and first text information corresponding to a first dimensionality type, the second information e-card includes second graphic information and second text information corresponding to a second dimensionality type;
    forming new context information by reconstructing the first text information and the second text information according to the pre-set formula of the formula e-card; and
    displaying the new context information on the terminal device.

2. The method according to claim 1, wherein the first dimensionality type and the second dimensionality type are different and are selected from two of a character dimensionality type, an object dimensionality type, an event dimensionality type, a time dimensionality type, and a place dimensionality type.

3. The method according to claim 1, further comprising:
    receiving the first dimensionality type and the second dimensionality type appointed by the user; and
    displaying the first information e-card corresponding to the first dimensionality type appointed by the user and the second information e-card corresponding to the second dimensionality type appointed by the user.

4. The method according to claim 3, further comprising:
    displaying a graphical displaying interface to receive an appointing instruction from the user to appoint the first dimensionality type and the second dimensionality type.

5. The method according to claim 1, wherein the pre-set formula of the formula e-card is of at least one of a replacing function, a combining function, and an associating function.

6. The method according to claim 5, wherein forming the new context information by reconstructing the first text information and the second text information according to the pre-set formula of the formula e-card includes:
    replacing the first text information with the second text information;
    combining the first text information with the second text information; or
    associating the first text information with the second text information.

7. The method according to claim 1, wherein the first dimensionality type and the second dimensionality type are randomly selected from multiple dimensionality types.

8. A terminal device for displaying e-card, comprising:
    a memory;
    a processor coupled to the memory; and
    a plurality of interfaces stored in the memory to be executed by the processor, the plurality of interfaces including:
        a task starting interface for a user to input a task starting instruction through the task starting interface;
        an e-card displaying interface displaying at least two information e-cards and at least one formula e-card based on the task starting instruction, wherein the at least two information e-cards each include a corresponding dimensionality type, and the at least one formula e-card includes a formula sign corresponding to a pre-set formula and a formula text corresponding to the formula sign;
        a selecting interface for the user to select a first information e-card and a second information e-card from the at least two information e-cards and to select a formula e-card from the at least one formula e-card, wherein the first information e-card includes first graphic information and first text information corresponding to a first dimensionality type, the second information e-card includes second graphic information and second text information corresponding to a second dimensionality type; and a new context information displaying interface, after reconstructing the first text information and the second text information according to the pre-set formula of the formula e-card to form new context information, displaying the new context information on the terminal device.

9. The terminal device according to claim 8, wherein the first dimensionality type and the second dimensionality type are different and are selected from two of a character dimensionality type, an object dimensionality type, an event dimensionality type, a time dimensionality type, and a place dimensionality type.

10. The terminal device according to claim 8, further comprising:

a dimensionality appointing interface receiving the first dimensionality type and the second dimensionality type appointed by the user.

11. The terminal device according to claim 10, wherein the e-card displaying interface displays the first information e-card corresponding to the first dimensionality type appointed by the user and the second information e-card corresponding to the second dimensionality type appointed by the user.

12. The terminal device according to claim 8, wherein the pre-set formula of the formula e-card is of at least one of a replacing function, a combining function, and an associating function.

13. The terminal device according to claim 12, wherein the new context information is generated by:

replacing the first text information with the second text information;

combining the first text information with the second text information; or associating the first text information with the second text information.

14. A non-transitory computer-readable medium comprising a computer readable code for, when being executed by at least one processor of a terminal device, configuring the at least one processor to perform:

displaying an instruction receiving interface;

receiving a task starting instruction inputted by a user through the instruction receiving interface;

displaying at least two information e-cards and at least one formula e-card based on the task starting instruction, wherein the at least two information e-cards each include a corresponding dimensionality type, and the at least one formula e-card includes a formula sign corresponding to a pre-set formula and a formula text corresponding to the formula sign;

displaying a selecting interface for the user to select a first information e-card and a second information e-card from the at least two information e-cards and to select a formula e-card from the at least one formula e-card, wherein the first information e-card includes first graphic information and first text information corresponding to a first dimensionality type, the second information e-card includes second graphic information and second text information corresponding to a second dimensionality type;

forming new context information by reconstructing the first text information and the second text information according to the pre-set formula of the formula e-card; and displaying the new context information on the terminal device.

15. The non-transitory computer-readable medium according to claim 14, wherein the first dimensionality type and the second dimensionality type are different and are selected from two of a character dimensionality type, an object dimensionality type, an event dimensionality type, a time dimensionality type, and a place dimensionality type.

16. The non-transitory computer-readable medium according to claim 14, wherein the at least one processor is further configured to perform:

receiving the first dimensionality type and the second dimensionality type appointed by the user; and displaying the first information e-card corresponding to the first dimensionality type appointed by the user and the second information e-card corresponding to the second dimensionality type appointed by the user.

17. The non-transitory computer-readable medium according to claim 16, wherein the at least one processor is further configured to perform:

displaying a graphical displaying interface to receive an appointing instruction from the user to appoint the first dimensionality type and the second dimensionality type.

18. The non-transitory computer-readable medium according to claim 14, wherein the pre-set formula of the formula e-card is of at least one of a replacing function, a combining function, and an associating function.

19. The non-transitory computer-readable medium according to claim 18, wherein forming the new context information by reconstructing the first text information and the second text information according to the pre-set formula of the formula e-card includes:

replacing the first text information with the second text information;

combining the first text information with the second text information; or associating the first text information with the second text information.

20. The non-transitory computer-readable medium according to claim 14, wherein the first dimensionality type and the second dimensionality type are randomly selected from multiple dimensionality types.

* * * * *